United States Patent
O'Shea (10) Patent No.: US 8,245,055 B2
(45) Date of Patent: Aug. 14, 2012

(54) METHOD FOR FIRMWARE CONTROL INVOCATION FROM POWER MANAGEMENT

(75) Inventor: David J. O'Shea, Costa Mesa, CA (US)

(73) Assignee: Intel Corporation, Santa Clara, CA (US)

( * ) Notice: Subject to any disclaimer, the term of this patent is extended or adjusted under 35 U.S.C. 154(b) by 3118 days.

(21) Appl. No.: 10/335,020

(22) Filed: Dec. 31, 2002

(65) Prior Publication Data

US 2004/0128568 A1    Jul. 1, 2004

(51) Int. Cl.
  *G06F 1/32* (2006.01)
  *G06F 1/26* (2006.01)
  *G06F 15/177* (2006.01)
(52) U.S. Cl. ........ 713/300; 713/1; 713/2; 713/310; 713/320; 713/323

(58) Field of Classification Search ........... 713/1, 2, 713/100, 300, 310, 330, 340, 320–324
See application file for complete search history.

(56) References Cited

U.S. PATENT DOCUMENTS

| | | | |
|---|---|---|---|
| 6,105,142 A * | 8/2000 | Goff et al. | 713/324 |
| 2003/0041273 A1* | 2/2003 | Wang | 713/300 |
| 2004/0015941 A1* | 1/2004 | Sekine | 717/168 |

OTHER PUBLICATIONS

Utility program, http://www.atis.org/tg2K/_utility_program.html, retrieved on May 3, 2007.*

* cited by examiner

*Primary Examiner* — Fahmida Rahman
(74) *Attorney, Agent, or Firm* — Blakely, Sokoloff, Taylor & Zafman LLP (57) ABSTRACT

A method for usurping control of a computer system from an operating system using a mechanism otherwise used to enable the entry of the computer system into a lower power state.

17 Claims, 5 Drawing Sheets

METHOD FOR FIRMWARE CONTROL INVOCATION FROM POWER MANAGEMENT

FIELD OF THE INVENTION

The present invention is related to the use of a mechanism meant to enable power control functionality of a computer system to be used to usurp control of the computer system from an operating system to execute code unrelated to either power management or the operating system.

BACKGROUND

The enabling of the transfer of control of a computer system between a piece of firmware (software that is at least initially stored in nonvolatile memory within the hardware making up the computer system—sometimes referred to as embedded software) and an operating system is widely known where provision has been made for such a transfer of control within both the piece of firmware and the operating system. This is usually seen where both the computer system, including the firmware, and operating system are created by the same manufacturer.

However, a far greater number of computer systems and their firmware are created by manufacturers having no connection with the manufacturers of the operating systems that are typically executed on those computer systems, especially in the case of personal computers where end users are accustomed to having pieces of hardware and software provided by numerous unrelated manufacturers. In such cases, the operating systems are often created with the inherent assumption that once the operating system begins to be executed by the computer system, the operating system will not transfer control of the computer system to any other piece of software. Even in situations where an operating system created by a manufacturer separate from that of a computer system ostensibly makes provision for transferring control to a piece of firmware provided by the manufacturer of the computer system for a specific limited purpose, such as supporting power management, it is often the case that the manufacturer of the operating system discourages the use of such a provision, and it is frequently the case that such a provision is implemented with sufficient limitations and/or undesirable characteristics that use of such a provision is widely deemed to be undesirable.

Indeed, all known present operating systems making some provision for firmware are designed to not allow for the execution of just any form of firmware. Such provisions, where they exist, are designed to support the carrying out of only narrowly defined functions by firmware. An example of such limited provision may be found in the Advanced Configuration and Power Interface (ACPI) Specification, a specification of a standard for power management agreed to by numerous manufacturers of hardware and software commonly associated with personal computer systems. ACPI defines a provision for the use of firmware to carry out only very specific power management functions to support unique pieces of hardware.

The end result in cases where the computer system, along with its firmware, and the operating system are created by different manufacturers is that the end user of such a computer system is never provided with the option of being able to temporarily halt execution of the operating system in order to make use of a piece of firmware unrelated to the operating system without shutting down and restarting the computer system. This is the case because the opportunity to execute such firmware exists only immediately after such computer systems are powered on or restarted by the end user, and before execution of the operating system begins.

BRIEF DESCRIPTION OF THE DRAWINGS

The objects, features, and advantages of the present invention will be apparent to one skilled in the art in view of the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention.

The present invention concerns using a provision for power management functions provided by an operating system to enable the temporary halting of execution of the operating system to further enable the usurping of a computer system and the execution of firmware code unrelated to the operating system. Although the following discussion centers on the execution of firmware-based utilities provided by the manufacturer of at least some of the hardware making up a computer system while execution of the operating system is temporarily halted, it will be understood by those skilled in the art that the invention as hereinafter claimed may be practiced in support of executing other varieties of software while execution of the operating system is temporarily halted. Also, although the following discussion centers on the usurping of a computer system, it will be understood by those skilled in the art that the invention as hereinafter claimed may be practiced in connection with other electronic devices having a processor, executing code for an operating system, and having support for power management.

Figure 1:
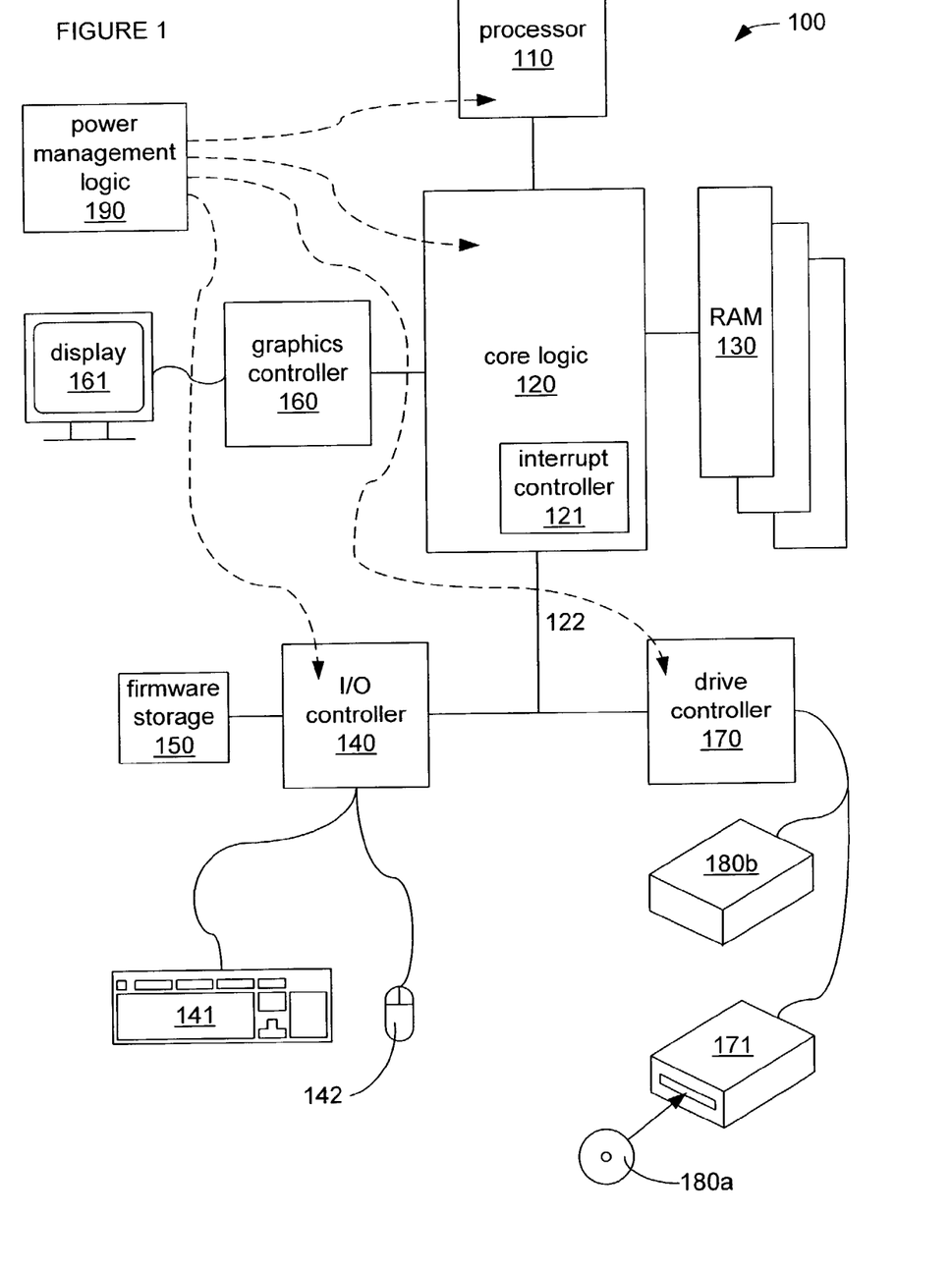
FIG. 1 is a block diagram of one embodiment employing a computer

FIG. 1 is a block diagram of one embodiment employing a computer system. Computer system 100 is comprised of processor 110 connected to core logic 120, which includes interrupt controller 121, and is connected to bus 122, RAM 130 and graphics controller 160. Bus 122 is used to connect I/O and other devices to core logic 120, including I/O controller 140 and drive controller 170. I/O controller 140 is further connected, in turn, to keyboard 141, mouse 142 and firmware storage 150. Graphics controller 160 is further connected, in turn, to display 161. Drive controller 170 is further connected, in turn, to removable media drive 171, which can read data stored on media 180a, and non-removable media drive 180b. Computer system 100 may also be comprised of power management logic 190, which as the dotted lines emanating from power management logic suggest, may be connected to or embedded within any one device or any combination of devices within computer system 100, including processor 110, core logic 120, I/O controller 140 and/or drive controller 170.

Processor 110 is the processing unit of computer system 100, though in alternate embodiments, there may be more than one processor. Core logic 120 is comprised of one or more integrated circuits, and is often referred to as a "chipset" or "support chipset" in reference to its function of providing much of the basic logic required to support processor 110. Part of this support is controlling and providing access to RAM 130, which in many embodiments is the main solid state memory storage for data and executable code for software being executed by computer system 100, and is usually comprised of dynamic random access memory of any of a number of technologies. In some embodiments, another part of this support is controlling and/or coordinating the occurrence and responses to interrupts through interrupt control logic such as interrupt controller 121. In alternate embodiments, interrupt control and/or coordination is carried out by other hardware making up computer system 100, either in lieu of or in addition to core logic 120, including, but not limited to I/O controller 140.

I/O controller 140 provides computer system 100 with interfaces to various possible peripheral devices, and although those peripheral devices are depicted in FIG. 1 as being keyboard 141 and mouse 142, it will be understood by those skilled in the art that I/O controller 140 may be connected to any of a number of possible peripheral devices, either in lieu of or in addition to those shown. Firmware storage 150 is a non-volatile memory device making use of any of a number of technologies, including FLASH, ROM, EPROM, EEPROM, magnetic disk, optical disk, etc., and is used to store executable code required to initialize and otherwise prepare computer system 100 for use upon the powering up or restarting of computer system 100. In some embodiments, firmware storage 150 may be used to also store executable code for a piece of what is commonly referred to as "setup" software to provide a user of computer system 100 with software-based control over various configuration options for computer system 100. In other embodiments, firmware storage 150 may be used to also store executable code for diagnostics software. It has long been a common practice in the art of personal computer system design to connect firmware storage 150 to I/O controller 140 or equivalent component connected to core logic 120 via bus 122 or other form of connection. This has long been the case since the memory devices typically chosen to make up firmware storage 150 have often been far slower than those chosen to make up RAM 130, and so there was little need to provide a more direct connection between processor 110 and firmware storage 150 that would match the speed of the connection normally provided between processor 110 and RAM 130. However, as those skilled in the art will readily recognize, there is no reason why firmware storage 150 could not be connected at other points of computer system 100 in various embodiments, including a direct connection to either core logic 120 or processor 110.

Graphics controller 160 is a device used by computer system 100 to drive display 161 to graphically present information to a user of computer system 100. It is common practice, especially in the case of personal computers, to provide as speedy a connection as possible between graphics controller 160 and both processor 110 and RAM 130 for sake of achieving optimal performance results in presenting information to a user of computer system 100 on display 161. For this reason, it is commonplace to directly connect graphics controller 160 to core logic 120 in many embodiments, and indeed, in many other embodiments, it is commonplace to combine graphics controller 160 and core logic 120. However, as those skilled in the art will readily recognize, graphics controller 160 may be connected to the rest of the hardware of computer system 100 at any of a number of points, including but not limited to, bus 122, or through I/O controller 140. Those skilled in the art will also readily recognize that although it is common practice to provide at least some rudimentary form of graphics system in any computer system, a graphics system is not necessary to make computer system 100 complete enough for use, and therefore, graphics controller 160 and display 161 may not be present in some embodiments of computer system 100, such as a server.

Drive controller 170 is used by computer system 100 to control and access storage drives such as removable media drive 171 and non-removable media drive 180b. Although drive controller 170 is depicted as being connected to the rest of the hardware of computer system 100 by way of bus 122, those skilled in the art will readily recognize that this connection to drive controller 170 could be at any of a number of points within computer system 100 and by any of a number of technologies and interfaces. Removable media drive 171 may be any of a number of types of drives, including CD-ROM, DVD-ROM, floppy, tape, magneto-optical, etc., and media 180a may be of any of a variety of possible forms of media appropriate to match the form of removable media drive 171. In many embodiments, non-removable media drive 180b is some form of what is commonly known as a "hard disk" or "non-removable disk" in which data magnetically stored, but could be any of a number of types of drives based on any of a number of technologies in which the storage media normally remains within the drive, itself, in contrast to the media of removable media drive 171. However, although computer system 100 is depicted as having drive controller 170 and accompanying drives for storage, those skilled in the art will readily recognize that computer system 100 may employ a connection, such as an interface to a network, in addition to or lieu of drive controller 170 and accompanying drives, to obtain and/or store executable code and/or data remotely on one or more other devices, including computers employed as servers.

Power management logic 190 is a device used to manage the power state of computer system 100 by controlling the distribution of power to one or more of the devices making up computer system 100. In various possible embodiments, one or more devices of computers system 100 may selectively be provided with full power, reduced voltage and/or reduced current. As alluded to earlier, power management logic 190 may be embedded within any of a number of components of computer system 100. As those skilled in the art will recognize, it is common practice to distribute portions of power management logic 190 throughout multiple components of computer system 100, even thought power management logic 190 is being depicted and referred to herein as if it were a single entity for purposes of clarity in discussion.

Upon being powered up or restarted, processor 110 in various embodiments of computer system 100 accesses firmware storage 150 to obtain code (commonly also called "fetching") to execute to initialize computer system 100 for use. In some embodiments, at least part of the executable code within firmware storage 150 is copied into one or more predetermined locations within RAM 130, since RAM 130 is often faster than firmware storage 150, thereby allowing that executable code to be accessed and executed by processor 110 more quickly. At least some of the executable code within firmware 150 causes the processor to initialize various components within computer system 100, perhaps causing the processor to carry out various tests to determine the exact configuration of the hardware existing within computer system 100, and causing processor 110 to write various values into various registers and/or other parts within computer system 100 to configure them for use, and in various embodiments, this would include configuring some form of power control logic. During initialization, in some embodiments, the user of computer system 100 is provided an option to choose whether to execute code within firmware storage 150 that allows the user to configure and/or test various aspects of computer system 100, or to proceed to loading and then executing an operating system.

Presuming that either the user is not provided an option to execute such code within firmware storage, or the user does not use such an option, in many embodiments, after initialization, executable code within firmware storage 150 causes processor 110 to load and begin execution of executable code making up an operating system from either media 180a in removable media drive 171 and/or non-removable media drive 180b. Along with executable code for an operating system comes executable code for power management. In some embodiments, this executable code for power management may be integrated within the executable code of the operating system. In other embodiments, this executable code for power management may be additional code that is caused to be loaded and executed by the code making up the operating system. Upon the loading and start of execution of code for the operating system and power management, normal operation of computer system 100 commences.

At some point during normal use of computer system 100, either action by a user of computer system 100 or other stimulus causes executable code for software to usurp control of computer system 100 from the operating system to also be loaded and executed to the extent necessary to enable control of computer system 100 to be usurped from operating system 100 in a manner that uses the mechanism that is normally used for placing computer system 100 in a lower power state. Essentially, this code for usurping control defines memory locations where coordinating information may be placed and/or readies pieces of executable code that aids in taking over control of computer system 100 from the operating system and giving control over to executable code within firmware 150 at a time when code for power management would normally cause the temporary halting of execution of the code for the operating system as part of causing computer system 100 to enter a lower power state.

In many embodiments, when the executable code for power management is executed to prepare computer system 100 to enter a lower power state, information concerning the configuration and current operating state of computer system 100 and the operating system is copied and stored at some location where it will not be lost while computer system 100 is in a lower power state. Also, various residual pieces of information that need not be copied, but which will become invalid as a result of entering a lower power state may be cleared, such as copies of data residing in a cache within processor 110. Finally, other preparations may be made to put in place the manner in which computer system 100 will be caused to exit a lower power state at some later time so that execution of code for the operating system will resume. In some embodiments, the executable code for power management may cause the operating system to relinquish control of computer system 100 and give control to executable code provided within firmware storage 150 for the purpose of assisting in specific aspects of preparing computer system 100 for entry into a lower power state. In other embodiments, where neither the operating system nor the power management code are designed to give control to code residing within firmware storage 150 as part of such preparations, there may be an option provided within the operating system or the power management code for the manufacturer of computer system 100 to add code that executes under the control of the operating system and/or the power management code that causes this relinquishing of operating system control to executable code within firmware storage 150.

In some embodiments, it is at the point at which control of computer system 100 has been relinquished to executable code within firmware storage 150 for purposes of preparation to enter a lower power state that executable code within firmware 150 actually uses the relinquished control of computer system 100 to usurp or "steal away" computer system 100 from the operating system to perform a task unrelated to preparations for entering a lower power state, instead. In some embodiments, this other task may be to carry out diagnostic tests, run setup software, perform maintenance tasks, etc. Upon completion of execution of such code to perform one or more of such tasks, control of computer system 100 is returned to the operating system just as if code within firmware storage 150 for making preparations for computer system 100 to enter a lower power state had been fully executed.

Alternatively, in other embodiments, the moment at which control of computer system 100 is usurped from the operating system may not be during preparations for computer system 100 to enter a lower power state, but may be at the time when the actual entry into a lower power state is meant to take place. In some variations of these embodiments, this may entail the power management code causing the operating system to relinquish control to code within firmware 150 to aid in carrying out some aspect of causing computer system 100 to enter a lower power state. In other variations of these embodiments, an option may have been provided within either the power management code or the operating system for the manufacturer of computer system 100 to add code to assist in carrying out causing computer system 100 to enter a lower power state, and this additional code may then be made to relinquish control of computer system 100 to code within firmware 150. Regardless of the exact manner in which operating system control is relinquished to code within firmware 150, computer system 100 is usurped or "stolen away" from the operating system to carry out an unrelated task and then control is returned to the operating system so that computer system 100 may either actually enter a lower power state, if desired, or execution of the operating system may resume as if computer system 100 had just exited a lower power state.

Figure 2:
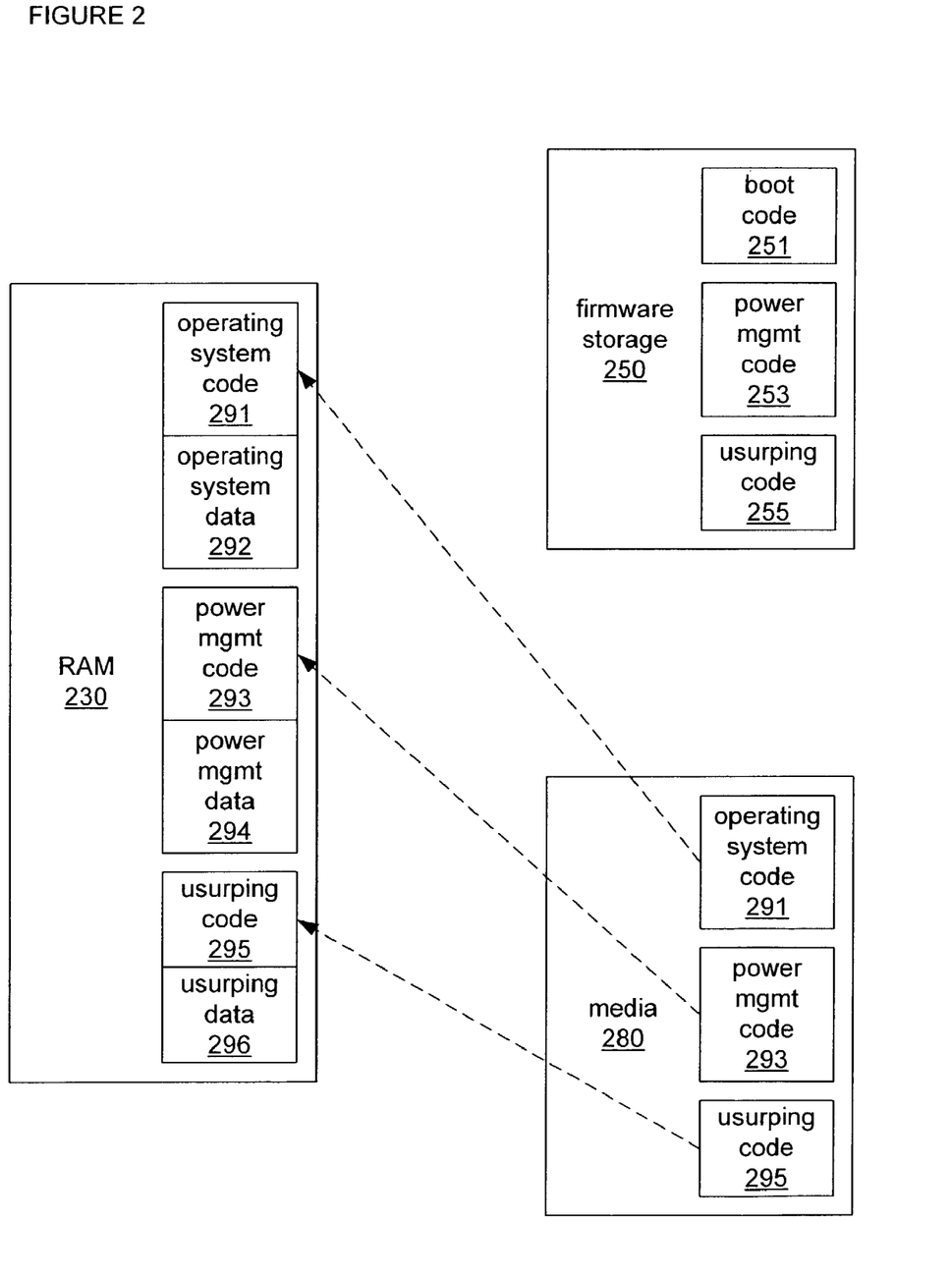
FIG. 2 is a block diagram of another embodiment having executable code and data stored in multiple places.

FIG. 2 is a block diagram of another embodiment having executable code and data stored in multiple places for use by a computer system. Firmware storage 250 is made up of one or more non-volatile memory storage devices and is a component of a computer system (e.g., computer system 100 of FIG. 1). In some embodiments, firmware storage 250 may be implemented to limit access during normal operation of the computer system, such that special procedures are required to rewrite the contents of firmware storage 250. Such limits may be due to the nature of the technology used to implement firmware storage 250, or may be by deliberate design for such purposes as security or preventing accidental erasure. Within firmware storage 250 resides boot code 251, power management code 253 and usurping code 255. Boot code 251 is executable code accessed by a processor of the computer system and causes the processor to begin initializing the computer system upon the power up or restarting of the computer system. Power management code 253 is made up of executable code executed during the normal operation of the computer system to aid in preparing for and/or carrying out the transitioning of the computer system between higher and lower power states. Usurping code 255 is made up of executable code executed during the preparation for and/or carrying out of the transitioning of the computer system between higher and lower power states to usurp control of the computer system away from an operating system and/or power management code executing under the control of an operating system to enable the computer system to perform tasks unrelated to either the operating system or to power management.

Media 280 is made up of one or more pieces of media, whether removable or not, on which data and/or executable code made be stored. In some embodiments, media 280 is made up of one or more floppy diskettes and/or CD-ROM disks on which executable code to be loaded into the computer system and executed by the processor are stored. In other embodiments, media 280 is made up of the platters of one more non-removable disk drives, such as one or more hard disks installed in the computer, providing a location local to the computer system on which data and/or executable code may be stored. In still other embodiments, media 280 is made up of any of a variety of forms of storage media maintained under the control of another remotely located electronic device, such as a remote computer system or network-attached storage device to which the computer system has access to by way of some form of network or other remote connection. Within media 280 resides operating system code 291, power management code 293 and usurping code 295. Operating system code 291 is the executable code making up the operating system. Power management code 253 is the executable code executed under the control of the operating system to control the preparation for and/or carrying out of transitioning the computer system between higher and lower power states. Power management code 253 may be an integrated part of operating system code 291 in some embodiments, or in other embodiments, may be separately loaded, possibly as an option to be selected by a user of the computer system. Usurping code 295 is made up of executable code executed at some point during execution of the operating system to enable the later usurping of control of the computer system from the operating system to execute code unrelated to the operating system and/or power management at a later time when preparations are made to enter a lower power state and/or when a transition to a lower power state is actually begun.

RAM 230 is made up of one or more memory storage devices based on a technology that may be chosen for low latencies in access, but could be based on any of a wide number of technologies. Within RAM 230 resides operating system code 291 along with operating system data 292, power management code 293 along with power management data 294, and usurping code 295 along with usurping data 296. As indicated by the dotted lines in FIG. 2, operating system code 291, power management code 293 and usurping code 295 are at least partially loaded into RAM 230 from media 280. Operating system data 292, power management data 294 and usurping data 296 are created as a result of the execution of operating system code 291, power management code 293 and usurping code 295, respectively.

As those skilled in the state of the art will recognize, transitions of a computer system from normal execution of operating system code 291 to a lower power state where execution of operating system code 291 is temporarily halted may be initiated by action of a user of the computer system and/or as a result of power management code 293 responding to conditions such as lack of specific forms of activity and/or lack of use of specific components of the computer system. In some embodiments, transition to a lower power state has a distinct preparation phase where preparations are made by power management code 293 to enter a lower power state, followed by a period at which at least some normal execution of operating system code 291 may continue to occur, and then followed by a distinct transition phase where the transition to a lower power state actually occurs and execution of operating system code 291 is temporarily halted. In other embodiments, transition to a lower power state where execution of operating system code 291 is temporarily halted immediately follows preparations made by power management code 293.

Specific characteristics of lower power states vary greatly in implementation from computer system to computer system, and between different implementations of operating system code 291. A lower power state may entail reducing the consumption of power to the extent that only a bare minimum of circuitry needed to respond to a particular stimulus is allowed to continue consuming power in order to be able to respond to that stimulus by causing the rest of the computer system to exit the lower power state. In such a variation of lower power state, power management code 293 may cause all contents of RAM and/or other memory to be copied and stored in non-volatile storage, such as a hard drive, along with data concerning the settings of various registers and/or the state of the processor just prior to entering the lower power state. Other variations of a lower power state may entail entirely shutting down only some components of a computer system while placing other components in a mode where significantly less power is consumed. In such a variation of a lower power state, power management software 293 may cause components such as a hard disk drive to be shut down, completely, but then place RAM and/or other memory into a lower power state where only enough power is consumed to maintain the contents, but not enough to enable access to those contents (a state sometimes referred to as a "self-refresh mode"). Also, in such a variation of a lower power state, the processor clock may be halted so that operating system code 291 is no longer executed, but enough power may be permitted to be consumed by the processor to maintain the state the processor was in when the clock was stopped and/or to maintain any data still within buffers and/or registers within the processor, etc.

Where operating system code 291 and power management code 293 is created by a manufacturer unrelated to the manufacturer of the computer system on which such code is executed, and the manufacturer of such code seeks to make that code as generic as possible to permit its use with a wide assortment of computer systems, some mechanism is needed to allow unique aspects of lower power states in differing computer systems to be supported. In some embodiments, carrying out preparations for entering a lower power state will entail power management code 293 directly initiating execution of power management code 253 residing within firmware storage 250 to aid in making preparations that involve aspects that may be unique to the design of a specific computer system, specifically, hardware with characteristics that may be unique to a specific computer system. In such embodiments, there will be some form of protocol agreed to by the manufacturers of both the code and the computer system by which power management code 293 will carry out the initiating of execution of power management code 253. It is common practice for manufacturers of computer systems to create whatever code exists within firmware storage 250 to function in a manner that is largely self-contained in the sense that a presumption is made that no functioning operating system code will be available to assist in the execution of any code within firmware storage 250. Given this, it is usually necessary for operating system code 291 and/or power management code 293 to relinquish control of the computer system to power management code 253 when initiating execution of power management code 253. Manufacturers of computer systems often look upon this lack of dependence by power management code 253 on the availability of operating system as desirable since it also means that different versions of power management code 253 do not have to be created to support different versions of operating system code 291 and/or power management code 293. However, manufacturers of various versions of operating system code 291 tend to look upon this relinquishing of control as being undesirable, since it requires relying on whatever code within firmware storage 250 that is executed to not take actions that might negatively effect further execution of operating system code 291 and/or power management code 293, and relying on whatever code within firmware storage 250 to properly return control to operating system code 291 and/or power management code 293 in a way that does not induce malfunctions. Therefore, it is more common for embodiments of operating system code 291 and power management code 293 to be created by their manufacturers to never initiate execution of power management code 253, and for the manufacturers of operating system code 291 and power management code 293 to require that manufacturers of computer systems provide support for any unique features of their computer systems by providing code created to execute under the control of operating system 291 and/or power management code 293. However, as those skilled in the art will recognize, especially those with knowledge of the state of affairs regarding personal computers where such a "battle for control" has been ongoing for a number of years, it has become common practice for manufacturers of computer systems to design such code as was required to be executed under the control of operating system code 291 and/or power management code 293 to actually do little more than to directly initiate the execution of power management code 253 in defiance of the wishes of the creators of most versions of operating system code 291 and power management code 293, and it has become commonplace for the manufacturers of operating system code 291 and power management code 293 to begrudgingly accept this practice.

Regardless of how exactly initiation of execution of power management code 253 is brought about, usurping code 255 and 295 are provided to use the relinquishing of control of a computer system to power management code 253 as an opportunity to usurp or "steal away" the computer system from operating system code 291 and/or power management code 293 for unrelated purposes. At some point during normal execution of operating system code 291, usurping code 295 is executed and causes the processor of the computer system to make preparations for control of the computer system to be usurped at some later time when control is ostensibly being relinquished to power management code 253 for purposes of power management. In some embodiments, this preparation for usurping entails preparing a location in some part of the computer system's memory (usually with a software declaration that provides a way to define a fixed address) and/or in a register for a flag to be located in which a value will be written to indicate whether the next instance of relinquishing of control to power management code 253 should be allowed to proceed normally, or should be used as an opportunity to usurp control of the computer system. In alternative embodiments where power management code 293 supports having multiple versions of lower power state so that the degree or characteristics of power consumption can be varied, usurping code 295 makes preparation for usurping control by creating or altering at least one version of lower power state with settings and/or characteristics designed such that it is, in reality, a false version of lower power state, and if that specific version of lower power state is chosen, the result is the usurping of control.

In those embodiments where a flag is used, the value of the flag is examined when control is relinquished to ostensibly begin execution of power management code 253 within firmware storage 250, and if the value indicates that power management functions are actually meant to be carried out, then power management code 253 is executed to carry out whatever power management functions are required, and control is returned to operating system code 291 and/or power management code 293 at the appropriate time. If, however, the value of the flag indicates that a usurping of the computer system is actually meant to be carried out, then usurping code 295 is executed and carries out any of a number of possible tasks having little or nothing to do with power management (such as providing the user of a computer system with the option of executing setup software to alter details of the configuration of the computer system, executing diagnostics tests, executing debugging software for purposes of code development, etc.), and control can then be returned to operating system code 291 and/or power management control 293.

In those embodiments where multiple versions of lower power state are supported, the choice of version of lower power state could, itself, be the indication to code within firmware storage 150 as whether entry into a lower power state or usurping of control is actually the real intent. In such embodiments, a protocol by which an indication of which one of multiple possible lower power states is to be entered into is provided or otherwise made accessible to code residing within firmware storage 150, that indication may be used to select between executing power management code 253 and usurping code 255. In essence, usurping code 295 would make use of the support for multiple versions of lower power state to define a "false" version of lower power state, i.e., what looks like a lower power state, but which actually serves as a trigger for usurping control, the intent being that neither operating system code 291 or power management code 293 would not recognize this version of lower power state as being anything other than a legitimate lower power state that could be selected like any other version of lower power state.

As previously discussed, the opportunity to usurp control of the computer system may arise either at the time that control is relinquished to make preparations to enter a lower power state or at the time when a lower power state is to actually commence in embodiments where operating system code 291 and/or power management code 293 actually employ two such distinct phases. In such embodiments, it may be desirable to carry out the usurping of the computer system at the time when control is relinquished to make preparations, rather than wait for when the computer system is actually meant to enter a lower power state. A reason for this is that in some variations of these embodiments, there may be occasions where preparations are made, but where the act of entering a lower power state is not actually be attempted by operating system code 291 and/or power management code 293, which would mean that a desired opportunity to usurp control of the computer system would then be lost. Another reason for this is that it may be deemed undesirable to actually allow a full set of preparations to enter a lower power state to be made when usurping of control is ultimately what will occur instead of actually entering a lower power state, unless there is some part of the preparations that is desirable to allow to be completed, because it would in some way be advantageous to usurping control.

In various embodiments, regardless of whether or not a flag is actually needed to cause usurping of control, the use of a flag may still be desirable to provide a way to control aspects of what takes place when usurping occurs. For example, it may be desirable to provide a way to choose between running setup software, carrying out diagnostics tests, using debugging utilities, and/or carrying other functions when control of the computer system is usurped at a time before the actual usurping takes place. In these various embodiments, the value of the flag would then provide an indication of the choice that was made. A flag could also be used to store an indication of a result of some activity carried out while control of the computer was usurped so that when control is returned to operating system code 291 and/or power management code 293 an indication of success or failure or other result of something done while usurping was taking place could be provided to code being executed under the control operating system code 291. Such a flag could also be used as a way of preventing the actual entry of the computer system into a lower power state where the real intent was to usurp control, rather than enter a lower power state. Code provided by the manufacturer of the computer system to be executed under the control of operating system code 291 and/or power management code 293 could examine the flag for an indication of whether or not to signal power management code 293 that further preparations for entering a lower power state or the act of entering a lower power state should be aborted.

As those skilled in the art will recognize, the specific mechanism by which control is transferred from operating system code 291 and/or power management code 293 to code residing within firmware storage 250 can vary widely between different combinations of computer system, operating system code 291 and power management code 293, and between different configurations and/or settings made in conjunction with each of these. In some embodiments, where the computer system supports the use of interrupt handling to cause a processor to jump from executing one sequence of instructions to another, such interrupt handling support could be used to cause the initiating of execution of code residing within firmware storage 250 by causing a processor to jump from executing operating system code 291 and/or power management code 293 to executing code within firmware storage 250. In some variations of such embodiments, an interrupt control register would be used to trigger the sending of an interrupt signal to a processor, thereby causing it to halt execution of operating system code 291 and/or power management code 293, begin the process of determining which of one or more possible pieces of code should be executed in response to the interrupt, and thereby begin execution of code within firmware storage 250. Upon completion of the execution of such code within firmware storage 250, the processor would return to executing operating system code 291 and/or power management code 293 at the point where the processor was interrupted.

Although the discussion of FIG. 2 has referred to operating system code 291, power management code 293 and usurping code 295 as being loaded within a RAM to be executed by a processor, it will be recognized by those skilled in the art that it is common practice to employ some form of "page management" or "memory swapping" by which the contents of RAM within a computer system are selectively moved between RAM and temporary storage in another storage device, such as a hard disk. This is often done as one of various possible techniques to increase the effective size of a RAM (which is usually the fastest performing memory storage of a computer system, but which is often of rather limited quantity) beyond its actual capacity by swapping out parts of code and/or data that is not currently needed, thereby making more room for code and/or data that is needed or which may soon be needed. In some embodiments where this practice is employed, portions of media 280 may be used to hold the parts of code and/or data that are thereby "swapped out" of RAM.

Also, although the discussion of FIG. 2 has referred to the execution of code within firmware storage 250, it will be recognized by those skilled in the art that given the characteristics of most of the currently available non-volatile memory technologies that are likely to be employed in creating firmware storage 250, it is often the case that the RAM of a computer system offers far greater performance, and therefore, speedier execution of code, than firmware storage 250 is likely to be able to provide. For this reason, it is common practice to copy at least a portion of the code residing within firmware storage 250 to one or more locations within a RAM and carry out the actual reading of sequences of instruction making up such code from the RAM. Therefore, although such code may be correctly described as residing within firmware storage 250, it may actually be executed from a location within a RAM to which it has been copied.

Figure 3:
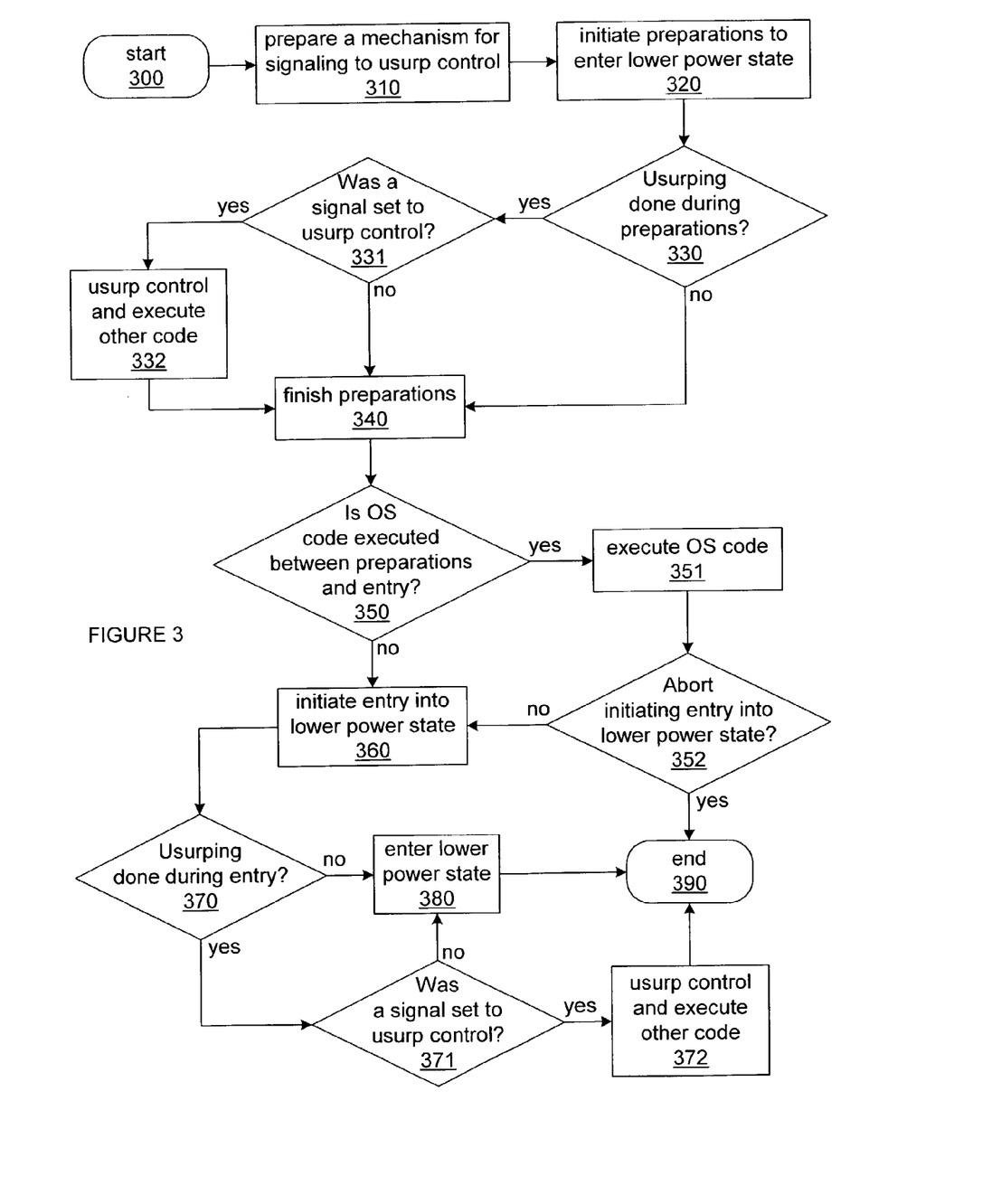
FIG. 3 is a flow chart of another embodiment.

FIG. 3 is a flow chart of another embodiment. Starting at 300, usurping code is executed to prepare some form of signaling mechanism at 310 by which a selection between power management and usurping control of a computer system for some other purpose can be communicated to code residing as firmware provided with at least some component of the computer system, such as a circuit or circuitboard forming part of the core of a computer system. With this signaling mechanism prepared, at 320, preparations for the computer to enter a lower power state are initiated.

If, at 330, the choice was made in creating whatever usurping software is used to have the usurping take place at the time that preparations are being made to enter a lower power state, then at 331, a check is made as to whether or not a signal has been given via the signaling mechanism to usurp control during this instance of preparations being made to enter a lower power mode. If such a signal has not been given, then preparations are allowed to continue directly to completion at 340. However, if such a signal has been given, then, at 332, control of the computer system is usurped and execution of whatever other code is desired takes place, and then control is relinquished to the code from which it was usurped and preparations for entering into a lower power state are allowed to be completed at 340 as normal.

Upon completion of preparations at 340, if at 350, the code for the operating system and/or any power management code incorporated into or loaded alongside the operating system was designed to permit further execution of the code of the operating system before entry into a lower power state is to be initiated, then such further execution takes place at 351. Then, if at 352, amidst such further execution of the code making up the operating system it is determined that entry into a lower power state should be aborted, perhaps due to a change in circumstances since preparations were initiated, execution of the code of the operating system continues as normal and further efforts at entering a lower power state or usurping control in this instance end at 390. However, if, at 350, the code for the operating system is not meant to resume execution between preparation and entry into a lower power state, or if, at 352, it is not determined that entry into a lower power state should be aborted, then at 360, entry into a lower power state is initiated.

If, at 370, the choice was made in creating whatever usurping software is used to have the usurping take place at the time that entry into a lower power state is initiated, then at 371, a check is made as to whether or not a signal has been given via the signaling mechanism to usurp control during this instance of initiating entering a lower power state. If such a signal has not been given, then entry into a lower power state is allowed to take place at 380 and further efforts at usurping control in this instance end at 390. However, if such a signal has been given, then, at 372, control of the computer system is usurped and execution of whatever other code is desired takes place, and further efforts at usurping control in this instance end at 390.

Figure 4:
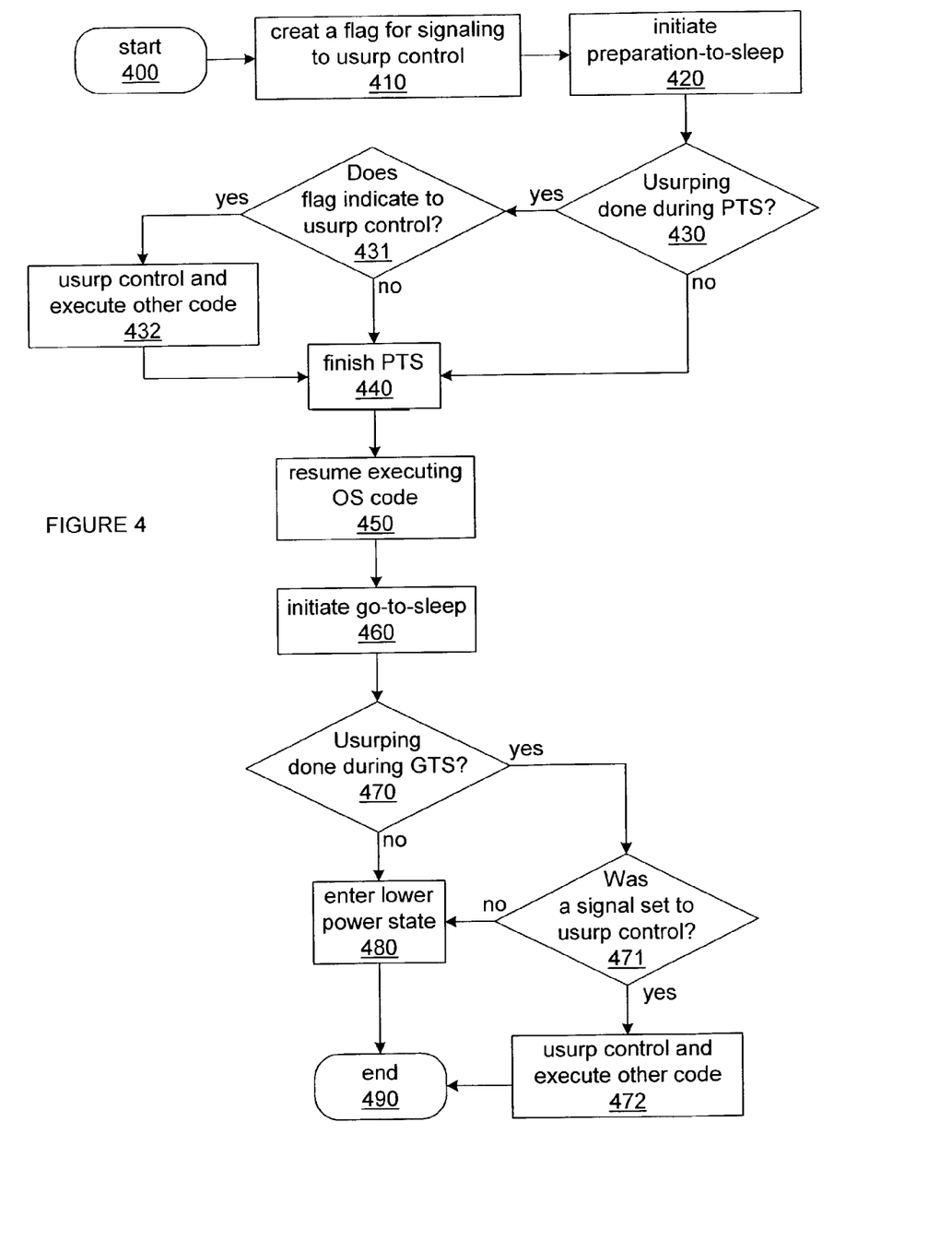
FIG. 4 is a flow chart of still another embodiment employing software for power management conforming to the Advanced Configuration and Power Interface (ACPI) Specification.

FIG. 4 is a flow chart of still another embodiment employing software for power management conforming to the Advanced Configuration and Power Interface (ACPI) Specification. ACPI is a specification for aspects of hardware and software interaction created in an effort to ensure interoperability in managing the consumption of power by products found largely in the personal computer industry.

Starting at 400, usurping code is executed to prepare some form of signaling mechanism at 410 by which a selection between power management and usurping control of a computer system for some other purpose can be communicated to code residing as firmware (often referred to as the Basic Input and Output System, or BIOS) provided with the motherboard of computer system. The specific mechanism may be one or more variables with fixed memory locations that are declared within usurping code written in an ACPI-compliant interpreted programming language known as ASL to be executed under control of the operating system, and declared within usurping code stored within BIOS and executed when the operating system's control of the computer system has been relinquished.

With this signaling mechanism prepared, at 420, preparations for the computer to enter a lower power state are initiated when the ACPI-compliant PTS call (also known as "prepare to sleep") is made, and the aforementioned usurping code written in ASL is executed. During the execution of PTS-related code, a value will be written to a register within hardware cooperating with a processor of the computer system (most likely within the core logic) to trigger the generation of an interrupt to cause the processor to jump from executing code under the control of the operating system to executing code with the BIOS. The exact register may be one specifically provided to support ACPI-compliant power management by providing a location in which a value indicating the specific version of lower power state into which the computer system is meant to enter.

If, at 430, the choice was made in creating the usurping software within the BIOS to have the usurping take place at the time that PTS-related code is being executed, then at 431, a check is made as to whether or not a signal was given at an earlier time with a value stored in the aforementioned declared variable indicating that the current PTS-related activity is to be used as a vehicle to usurp control of the computer system, and not simply to carry out preparations for the computer system to enter a lower power state. If such a signal has not been given, then preparations are allowed to take place through the execution of PTS-related code within the BIOS until completion at 440. However, if such a signal has been given, then, at 432, usurping code within the BIOS is executed and control of the computer system is usurped to execute whatever other code is desired, and then the usurping code within the BIOS relinquishes control back to the PTS-related code that originally triggered the interrupt under the control of the operating system.

Upon completion of execution of PTS-related code at 440, it is likely that execution of at least some operating system code will temporarily resume at 450. At 460, the actual entry of the computer system into a lower power state is initiated when the ACPI-compliant GTS call (also known as "go to sleep") is made, and the aforementioned usurping code written in ASL is executed. During the execution of GTS-related code, a value will again be written to the same register within hardware that cooperates with a processor of the computer system to trigger the generation of an interrupt, again causing the processor to jump from executing code under the control of the operating system to executing code with the BIOS.

If, at 470, the choice was made in creating the usurping software within the BIOS to have the usurping take place at the time that GTS-related code is being executed, then at 471, a check is made as to whether or not a signal has been given at an earlier time in the manner previously described. If such a signal has not been given, then entry into a lower power state is allowed to take place through the execution of GTS-related code within the BIOS at 480, and further efforts at usurping control in this instance end at 490. However, if such a signal has been given, then, at 472, usurping code within the BIOS is executed and control of the computer system is usurped to execute whatever code is desired, and then the usurping code within the BIOS relinquishes control back to the GTS-related code that originally triggered the interrupt under the control of the operating system and further efforts at usurping control in this instance end at 490.

Figure 5:
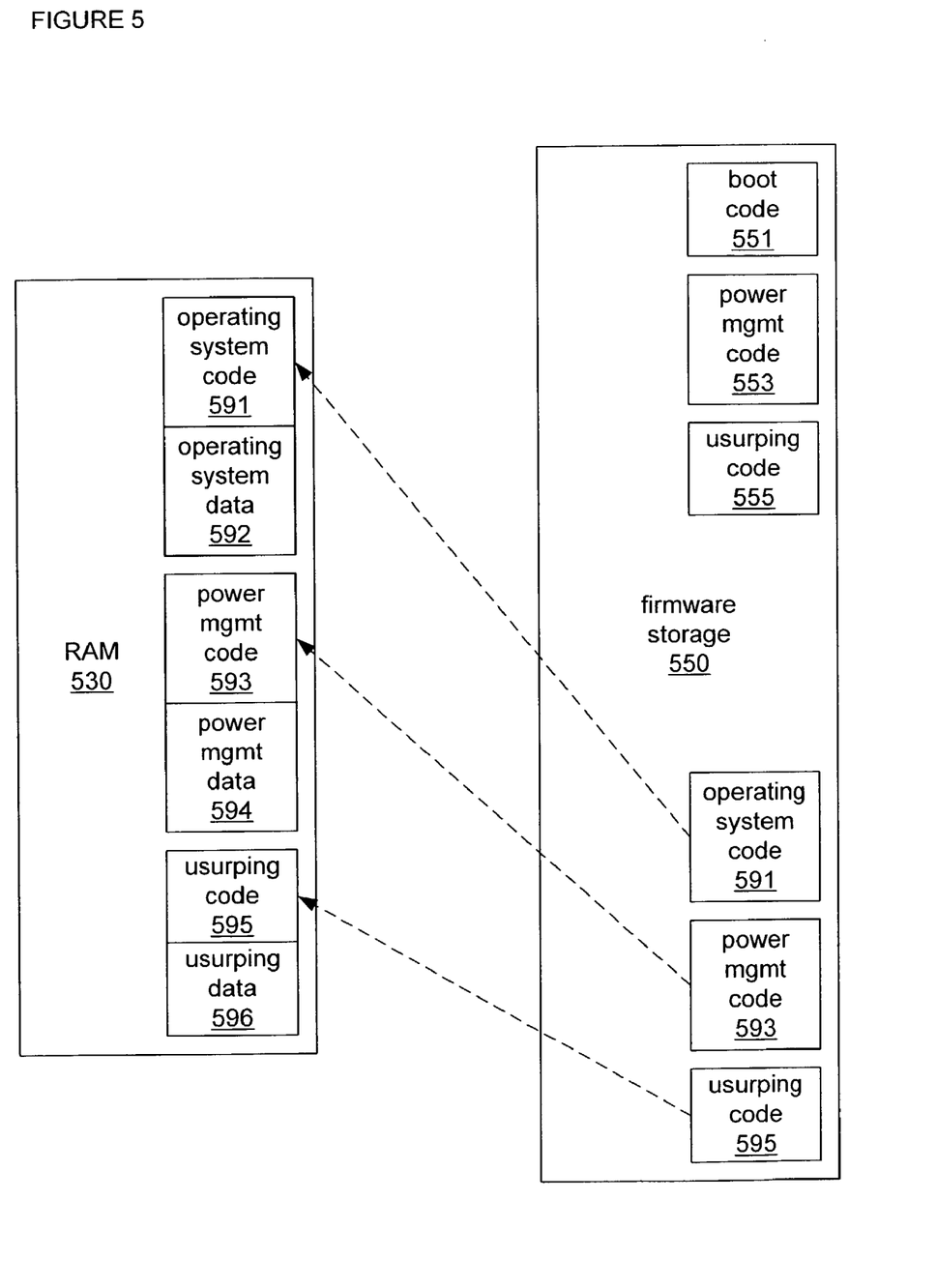
FIG. 5 is a block diagram of yet another embodiment having executable code and data stored in multiple places.

FIG. 5 is a block diagram of yet another embodiment having executable code and data stored in multiple places for use by an electronic device, such as a computer system. Firmware storage 550, like firmware storage 250 of FIG. 2, is made up of one or more non-volatile memory storage devices, is a component of an electronic device (e.g., computer system 100 of FIG. 1), and may be designed to limit access for purposes of rewriting its contents during normal use of the electronic device to which it belongs. Similarly to firmware storage 250, within firmware storage 550 resides boot code 551, power management code 553 and usurping code 555, and each of these perform functions corresponding to boot code 251, power management code 253 and usurping code 255. However, unlike firmware storage 250, within firmware storage 550 also resides operating system code 591, power management code 593 and usurping code 595, and each of these perform functions corresponding to operating system code 291, power management code 293 and usurping code 295. FIG. 5 depicts an embodiment with an allocation of storage of code that may be more appropriate to an electronic device in which an embedded operating system is desired, such as a PDA, notebook computer, controller in an audio/visual device, etc. It may be desirable to store an operating system in firmware storage 550 as opposed to some form of disk media or other memory separate from firmware storage 550 to reduce costs, reduce complexity, reduce power consumption, etc.

Like RAM 230 of FIG. 2, RAM 530 is made up of one or more memory storage devices based on a technology that may be chosen for low latencies in access, but could be based on any of a wide number of technologies. Within RAM 530 resides operating system code 591 along with operating system data 592, power management code 593 along with power management data 594, and usurping code 595 along with usurping data 596. As indicated by the dotted lines in FIG. 5, and in a manner largely similar to what was depicted in FIG. 2, operating system code 591, power management code 593 and usurping code 595 are at least partially loaded into RAM 530 from media 550, and operating system data 592, power management data 594 and usurping data 596 are created as a result of the execution of operating system code 591, power management code 593 and usurping code 595, respectively. It will be recognized by those skilled in the art that given the characteristics of most of the currently available non-volatile memory technologies that are likely to be employed in creating firmware storage 550, it is often the case that the RAM of an electronic device offers far greater performance, and therefore, speedier execution of code, than firmware storage 550 is likely to be able to provide. For this reason, it is common practice to copy at least a portion of the code residing within firmware storage 550 to one or more locations within a RAM and carry out the actual reading of sequences of instruction making up such code from the RAM. Therefore, although such code may be correctly described as residing within firmware storage 550, it may actually be executed from a location within a RAM to which it has been copied, such as RAM 530.

The invention has been described in conjunction with the preferred embodiment. It is evident that numerous alternatives, modifications, variations and uses will be apparent to those skilled in the art in light of the foregoing description. It will be understood by those skilled in the art that the present invention may be practiced in support of various types of computer systems such as portable notebook computers, desktop systems, rackmount server systems, etc. It will also be understood by those skilled in the art that the present invention may be practiced in support of electronic devices other than computer systems such as audio/video entertainment devices, controller devices in vehicles, appliances controlled by electronic circuitry, etc.

What is claimed is:

1. A method comprising:
    setting a signal to indicate that control of a computer system is to be usurped on a next occasion of preparations being made for the computer system to enter a lower power state;
    initiating preparations for the computer system to enter a lower power state;
    transferring control of the computer system from an operating system being executed on the computer system to enable power management code residing in a firmware storage to be executed;
    examining the signal to determine whether or not it was set to indicate that control is to be usurped;
    usurping control of the computer system to begin executing code in the firmware storage that is unrelated to both the operating system and to power management;
    completing execution of the code in the firmware storage that is unrelated to both the operating system and to power management;
    returning control of the computer system to enable resumption of execution of code of the operating system; and
    aborting entry by the computer system to a lower power state.

2. The method of claim 1, wherein setting the signal comprises declaring a variable to be allocated at a predetermined location in RAM within the computer system that is accessible to code executed under control of the operating system and to code residing in the firmware storage.

3. The method of claim 2, wherein examining the signal to determine whether or not it was set comprises reading the variable at the predetermined location in RAM within the computer system.

4. The method of claim 1, wherein initiating preparations for the computer system to enter a lower power state comprises using the "prepare-to-sleep" instruction of the ACPI specification.

5. The method of claim 1, wherein transferring control from the operating system being executed on the computer system comprises writing a value to a register of hardware of the computer system that causes an interrupt to be generated.

6. The method of claim 1, wherein beginning executing the code in the firmware storage that is unrelated to both the operating system and to power management comprises executing setup software residing in the firmware storage to enable configuring aspects of the hardware of the computer system.

7. The method of claim 1, wherein beginning executing the code in the firmware storage that is unrelated to both the operating system and to power management comprises executing diagnostics software residing in the firmware storage to enable testing of at least one piece of hardware of the computer system.

8. The method of claim 1, wherein beginning executing the code in the firmware storage that is unrelated to both the operating system and to power management comprises executing debugging software residing in the firmware to aid in the development of other software for execution on the computer system.

9. A non-transitory machine-accessible storage medium comprising code that when executed by a processor within an electronic device, causes the electronic device to:
    set a signal to indicate that control of a computer system is to be usurped on a next occasion of preparations being made for the computer system to enter a lower power state;
    initiate preparations for the computer system to enter a lower power state;
    transfer control of the computer system from an operating system being executed on the computer system to enable power management code residing in a firmware storage to be executed;
    examine the signal to determine whether or not it was set to indicate that control is to be usurped; and
    usurp control of the computer system to begin executing code in the firmware storage that is unrelated to both the operating system and to power management;
    wherein the execution of the code by the processor that causes the electronic device to set the signal comprises causing the electronic device to:
    create a version of lower power state with a corresponding identifier value;
    use the corresponding identifier value to distinguish between an occasion when preparations are to be made to enter a lower power state and an occasion when control of the computer system is to be usurped; and
    write that value to a register of the hardware of the computer system from which the value can be subsequently read to distinguish between a lower power state identified by the value for which preparations for entry should be made and a usurping of control of the computer system.

10. A non-transitory machine-accessible storage medium comprising code that when executed by a processor within an electronic device causes the electronic device to:
    set a signal to indicate that control of a computer system is to be usurped on a next occasion of preparations being made for the computer system to enter a lower power state;
    initiate preparations for the computer system to enter a lower power state;
    transfer control of the computer system from an operating system being executed on the computer system to enable power management code residing in a firmware storage to be executed;
    examine the signal to determine whether or not it was set to indicate that control is to be usurped;

usurp control of the computer system to begin executing code in the firmware storage that is unrelated to both the operating system and to power management;

complete execution of the code in the firmware storage that is unrelated to both the operating system and to power management;

return control of the computer system to enable resumption of execution of code of the operating system; and abort entry by the computer system to a lower power state.

11. The machine-accessible storage medium of claim 10, wherein the code that when executed causes the electronic device to set the signal comprises code that when executed causes the electronic device to declare a variable to be allocated at a predetermined location in RAM within the computer system that is accessible to code executed under control of the operating system and to code residing in the firmware storage.

12. The machine-accessible storage medium of claim 10, wherein the code that when executed causes the electronic device to initiate preparations for the computer system to enter a lower power state comprises code that when executed causes the electronic device to use the "prepare-to-sleep" instruction of the ACPI specification.

13. The machine-accessible storage medium of claim 10, wherein the code that when executed causes the electronic device to transfer control from the operating system comprises code that when executed causes the electronic device to write a value to a register of hardware of the computer system that causes an interrupt to be generated.

14. The machine-accessible storage medium of claim 10, wherein the code that when executed causes the electronic device to examine the signal to determine whether or not it was set comprises code that when executed causes the electronic device to read the variable at the predetermined location in RAM within the computer system.

15. The machine-accessible storage medium of claim 10, wherein the code that when executed causes the electronic device to execute the code in the firmware storage that is unrelated to both the operating system and to power management comprises code that when executed causes the electronic device to execute setup software residing in the firmware storage to enable configuring aspects of hardware of the computer system.

16. The machine-accessible storage medium of claim 10, wherein the code that when executed causes the electronic device to execute the code in the firmware storage that is unrelated to both the operating system and to power management comprises code that when executed causes the electronic device to execute diagnostics software residing in the firmware storage to enable testing of at least one piece of hardware of the computer system.

17. The machine-accessible storage medium of claim 10, wherein the code that when executed causes the electronic device to execute the code in the firmware storage that is unrelated to both the operating system and to power management comprises code that when executed causes the electronic device to execute debugging software residing in the firmware to aid in development of other software for execution on the computer system.

* * * * *